United States Patent [19]

Armbruster et al.

[11] Patent Number: 5,732,387
[45] Date of Patent: Mar. 24, 1998

[54] METHOD AND APPARATUS FOR CALL ESTABLISHMENT IN A SATELLITE COMMUNICATION SYSTEM

[75] Inventors: Peter Joseph Armbruster, Tempe; James Powers Redden, Mesa; Steven Paul Sawyer, Fountain Hills, all of Ariz.

[73] Assignee: Motorola, Schaumburg, Ill.

[21] Appl. No.: 566,617

[22] Filed: Dec. 4, 1995

[51] Int. Cl.⁶ ............................................. G01C 21/00
[52] U.S. Cl. .................. 701/206; 701/200; 455/13.2; 379/204; 379/208; 342/352; 310/328; 310/432
[58] Field of Search ........................... 364/449.9, 460, 364/449.7, 443; 370/209, 335, 431, 468, 332, 349; 379/59, 354, 357, 57, 58, 207, 67, 84, 204–208, 216; 455/33.1, 54.1, 13.3, 12.1, 51.2, 53.1, 13.1, 428–430, 38.2, 427, 67.1, 432, 451, 466; 341/352, 354, 557, 364, 457; 340/825.44

[56] References Cited

U.S. PATENT DOCUMENTS

| | | | |
|---|---|---|---|
| 4,500,989 | 2/1985 | Dahod | 370/431 |
| 5,214,774 | 5/1993 | Welsch et al. | 395/325 |
| 5,365,451 | 11/1994 | Wang et al. | 364/449.7 |
| 5,457,680 | 10/1995 | Kamm et al. | 370/322 |
| 5,463,400 | 10/1995 | Tayloe | 342/352 |
| 5,475,863 | 12/1995 | Simpson et al. | 455/33.1 |
| 5,490,087 | 2/1996 | Redden et al. | 455/33.1 |
| 5,506,886 | 4/1996 | Maine et al. | 379/57 |

OTHER PUBLICATIONS

Modern Science & Technology of Telecommunications, Scientific & Technical Information Center of MPT of China, Nov. 1991, Consecutive No. 142.

*Primary Examiner*—Jacques Louis-Jacques
*Attorney, Agent, or Firm*—Gregory J. Gorrie

[57] ABSTRACT

A subscriber unit (26) contains location data that expires after predetermined time periods that are based on the subscriber's mobility. When the location data has not expired, the subscriber unit requests access (108) to a satellite communication system (10) by providing location data within an access request message. The communication system performs a quick check (214) to validate the location data. Accordingly, time-consuming geo-location procedures are avoided when a call is initiated or being received. When the location data has expired, the subscriber unit requests access (110) without providing location data within the access request message. The communication system performs a complete geolocation procedure (210) to determine valid location data for the subscriber unit. The location data is sent (211) to the subscriber unit and time stamped (113).

22 Claims, 4 Drawing Sheets

METHOD AND APPARATUS FOR CALL ESTABLISHMENT IN A SATELLITE COMMUNICATION SYSTEM

FIELD OF THE INVENTION

This invention relates in general to the field of satellite communication systems, in particular to methods of access for satellite communication systems based on geographic location of the subscriber unit.

BACKGROUND OF THE INVENTION

Location data are extremely valuable to a communication network. Knowledge of mobile unit location allows the network to most advantageously route communications through nodes of the network. In addition, it allows the network to conform to diverse rules and procedures which may be imposed by diverse political entities within whose jurisdictions the network may operate. For example, one jurisdiction may permit network operations only within a first set of frequencies while an adjacent jurisdiction may permit network operations only within a second set of frequencies. In addition, different tariffs or taxes may apply to communication services utilized by mobile units operating in different jurisdictions.

The more accurate the location data, the better. More accurate data allow the network to better ascertain when mobile units cross from one jurisdiction into another. However, costs generally increase in proportion to the accuracy of the location data, and an intense need to keep costs as low as possible and revenues as high as possible exists. One cost, which is of particular concern, is the amount time required to determine the location of a subscriber unit each time a call is initiated. Another concern is the cost of communication resources which are consumed in maintaining current location data. As more resources are consumed in maintaining current location data, fewer resources are available for use by communication service subscribers and for generating revenues. In addition, mobile units are often battery operated, and an excessive quantity of communications leads to an excessive use of available battery power.

Thus what is needed are a method and apparatus that reduces the amount of time required for call set up and establishment. What are also needed are a method and apparatus that reduces the amount of communication resources in establishing a communication. What are also needed are a method and apparatus that saves battery power in portable communication devices.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a method and apparatus that reduces that amount of time required for call set-up in a satellite communication system. The present invention also reduces the amount of communication resources required during the establishment of a communication, and furthermore, the present invention reduces the amount of battery power used during call establishment procedures. The present invention allows a subscriber unit to use known location data when requesting access to the system. One advantage is that for a certain time period, neither the system nor the subscriber unit have to calculate location data in real-time when the subscriber unit desires to make a call. Accordingly, processing capability and communication bandwidth are conserved. The location data is preferably stored in the subscriber unit and is valid a predetermined amount of time. The amount of time depends on the subscriber unit's maximum velocity, or distance it may travel in a certain time period.

A "satellite" is defined herein to mean a man-made object or vehicle intended to orbit Earth and includes both geostationary and orbiting satellites and/or combinations thereof including low earth orbiting (LEO) satellites. A "constellation" is defined herein to mean an ensemble of satellites arranged in orbits for providing specified coverage for portions of Earth. As used herein the terms "cell", "antenna beam" and "antenna pattern" are not intended to be limited to any particular mode of generation and include those created by either terrestrial or satellite cellular communications systems and/or combinations thereof.

Figure 1:
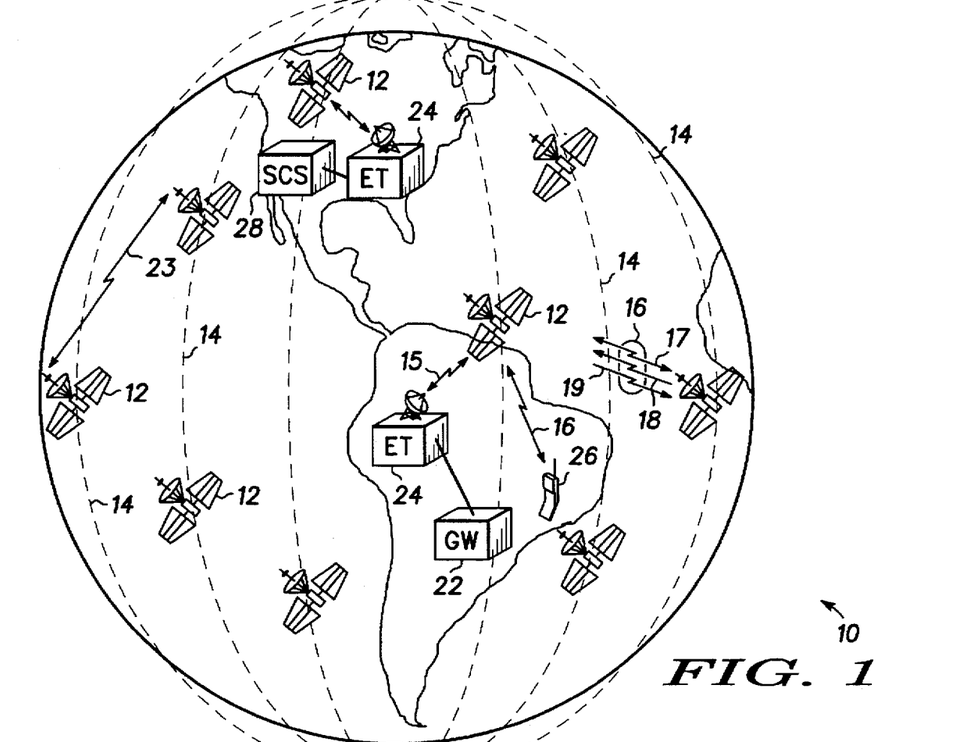
FIG. 1 illustrates a highly simplified diagram of a satellite-based communication system with which the present invention may be practiced.

FIG. 1 illustrates a highly simplified diagram of a satellite-based communication system with which the present invention may be practiced. Communication system 10 uses six polar orbits 14, with each orbit 14 holding eleven satellites 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of satellites 12. The present invention is also applicable to terrestrial communication systems.

For the example shown, satellites 12 travel with respect to Earth at around 25,000 km/hr, allowing satellite 12 to be visible to a terrestrial station for a maximum period of approximately nine minutes. Satellites 12 communicate with terrestrial stations which may include some number of radio communication subscriber units (SUs) 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 relay data packets (e.g., relating to calls in progress).

SUs 26 may be located anywhere on the surface of the Earth or in the atmosphere above the Earth. SUs 26 are preferably communications devices capable of transmitting data to and receiving data from satellites 12. By way of example, SUs 26 may be a hand-held, portable cellular telephones adapted to communicate with satellites 12. Ordinarily, SUs 26 need not perform any control functions for communication system 10.

System 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels. Links 16 are preferably combinations of L-Band frequency channels and may encompass Frequency Division Multiple Access (FDMA) and/or Time Division Multiple Access (TDMA) communications or combination thereof. Links 16 may also encompass Code Division Multiple Access communications. As a minimum, a satellite 12 continuously transmits over one or more broadcast channels 18. Subscriber units 26 synchronize to broadcast channels 18 and monitor broadcast channels 18 to detect data messages which may be addressed to them. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of a satellite 12. Traffic channels 17 are two-way channels that are assigned to particular subscriber units 26 by satellites 12 from time to time. Traffic channels 17 support real-time communications.

Satellites 12 communicate with other nearby satellites 12 through cross links 23. A communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

Figure 2:
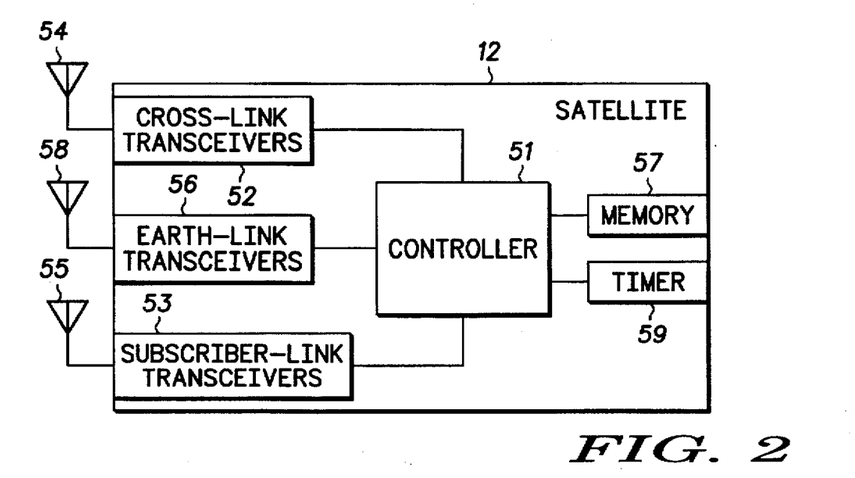
FIG. 2 illustrates a simplified block diagram of a satellite radio communication station suitable for use in a preferred embodiment of the present invention.

FIG. 2 illustrates a simplified block diagram of a satellite radio communication station suitable for use in a preferred embodiment of the present invention. Preferably, all satellites 12 within system 10 (see FIG. 1) include equipment as illustrated by the block diagram of FIG. 2. Satellite 12 includes cross-link transceivers 52 and associated antennas 54. Transceivers 52 and antennas 54 support cross-links to other nearby satellites 12. Earth-link transceivers 56 and associated antennas 58 support earth-links to communicate with earth terminals 24 (FIG. 1). Subscriber-link transceivers 53 and associated antennas 55 support subscriber-links 16 (FIG. 1). Preferably, each satellite 12 may simultaneously support a link for up to several thousand or more of subscriber units 26 (FIG. 1).

Controller 51 couples each of transceivers 52, 56, and 53 as well as to a memory 57 and a timer 59. Controller 51 may be implemented using one or more processors. Controller 51 uses timer 59 to maintain, among other things, the current date and time. Memory 57 stores data that serve as instructions to controller 51 and that, when executed by controller 51, cause satellite 12 to carry out procedures which are discussed below. In addition, memory 57 includes variables, tables, and databases that are manipulated during the operation of satellite 12.

Figure 3:
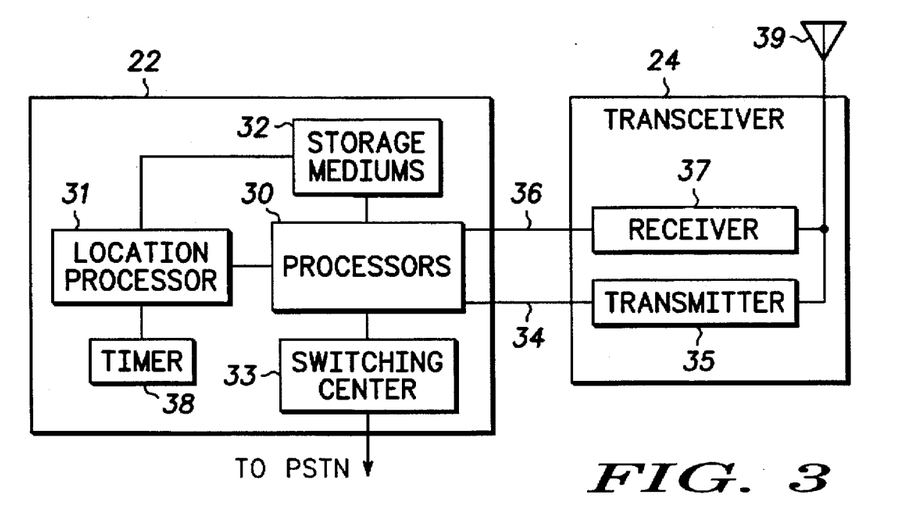
FIG. 3 illustrates a simplified block diagram of a gateway and an earth terminal suitable for use in a preferred embodiment of the present invention.

FIG. 3 illustrates a simplified block diagram of an earth terminal 24 and gateway 22 suitable for use in a preferred embodiment of the present invention. Gateway 22 includes processors 30 coupled to associated storage mediums 32. Earth terminal 24 includes antenna 39 coupled to transmitter 35 and receiver 37 via link. Transmitter 35 and receiver 37 are coupled to processors 30 via links 34 and 36, respectively. Processors 30 desirably carries out procedures exemplified below and described in the associated text. For example, in addition to performing other tasks as appropriate, processor 30 desirably stores results from such procedures in storage medium 32. Transmitter 35 and/or receiver 37 transmit messages to and/or receive messages from satellites 12.

Processor 30 generally controls and manages user access, message reception and transmission, channel set-up, radio tuning, frequency and time slot assignment, and other cellular radio communication and control functions. Among other things, processor 30 desirably executes procedures to allow user access to communication system 10. This may include procedures for protocols for channel setup and other associated functions as discussed below. Location processor 31 calculates geographic locations of subscriber units which are used for subscriber access and billing. Timer 38 is used to correlate subscriber location data with estimated location data. Furthermore, timer 38 may also be used to time-stamp subscriber unit location data generated by location processor 31. This is described in more detail below.

Switching center 33 is preferably similar to a telephone switching office for mobile originated and mobile terminated calls. Switching center 33 provides an interface to a PSTN. Storage mediums 32 include a home location register (HLR) data base which manages subscriber unit data and keeps track of a subscriber unit's location as it roams around the earth. HLR is a reference data base for subscriber unit parameters. Various identification numbers and addresses are stored within HLR, as well as authentication parameters, services subscribed, and special routing information.

Storage mediums 32 also include a visitor location register (VLR) where current subscriber unit status is also preferably maintained, including subscriber units' temporary roaming number. This data may be remotely accessed by the switching centers and VLRs. HLR and VLR desirably include an authentication center which is responsible for protecting against fraudulent system use. VLR may include current location data for subscriber units. This location data may include time-stamps associated therewith.

Earth terminal 24 provides an RF interface to communication satellites 12 (FIG. 1) as discussed above. Processors 30 of gateway 22 include an earth terminal controller (ETC) (not shown) which interfaces switching center 33 to satellites 12 (FIG. 1). ETC provides functions not supported by switching center 33 including provides a logical interface between subscriber units and switching center 33. ETC processes signaling data and routes traffic data exchanged between subscriber units and switching center.

Figure 4:
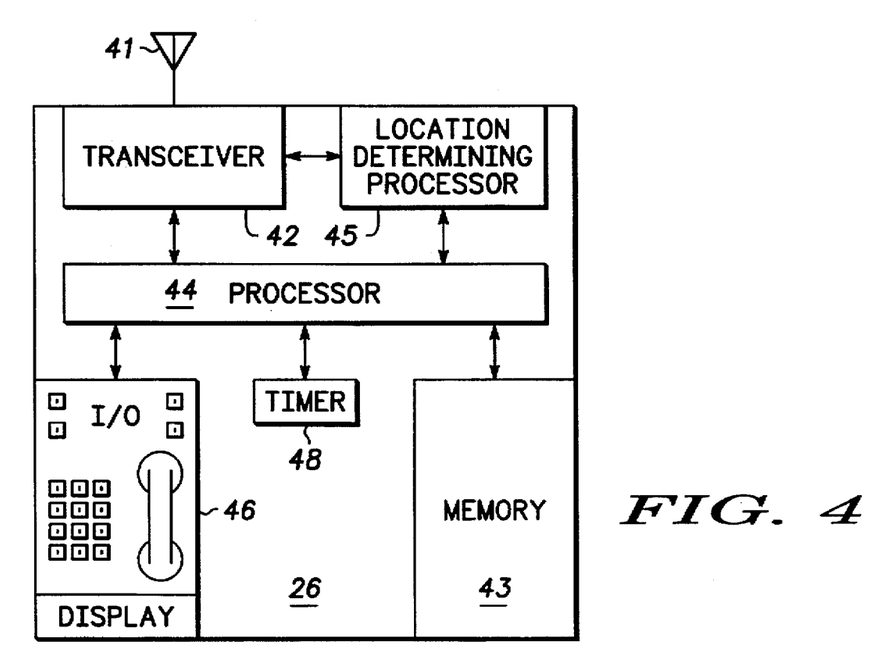
FIG. 4 illustrates a simplified block diagram of a subscriber unit suitable for use in a preferred embodiment of the present invention.

FIG. 4 illustrates a simplified block diagram of a subscriber unit suitable for use in a preferred embodiment of the present invention. Subscriber unit 26 (analogous to subscriber unit 26 of FIG. 1) communicates with communication system 10, and may also communicate through communication system 10 to other SUs 26 or another telecommunication device. Subscriber unit 26 includes transceiver 42 which transmits and receives signals to and from communication system 10 using antenna 41. Transceiver 42 is desirably a multi-channel transceiver capable of transmitting and receiving on all frequency channels in specified time slots as required by communication system 10.

Transceiver 42 desirably comprises an acquisition channel transceiver portion, a broadcast channel receiver portion and a traffic channel transceiver portion. The acquisition channel transceiver portion communicates on one of several acquisition channels as determined by satellite 12 and is primarily used during access protocols when a subscriber desires access to communication system 10 as previously discussed. The traffic channel transceiver portion communicates with communication system 10 on a traffic channel assigned by satellite 12. Those of ordinary skill in the art will understand that the acquisition channel transceiver portion, the broadcast channel receiver portion and the traffic channel transceiver portion may be contained in one transceiver unit capable of all three functions.

Transceiver 42 couples to a processor 44, which controls the frequency and timing parameters upon which transceiver 42 operates. In addition, processor 44 preferably controls the power level at which transceiver 42 transmits signals. Additionally, processor 44 desirably couples to input/output (I/O) section 46, timer 48 and memory 43. Processor 44 uses timer 48 to maintain the current date and time. Memory 43 includes storage devices for storing data which serve as instructions to processor 44 and which, when executed by processor 44, cause subscriber unit 26 to carry out procedures which are discussed below. In addition, memory 43 includes variables, tables, and databases that are manipulated during the operation of subscriber unit 26.

In one embodiment of the present intention, subscriber unit 26 includes location processor 45 for determining a geographic location of the subscriber unit. Location processor 45 may obtain location data using signals from global positioning system satellites (GPS), or may obtain location data from satellites shown in system 10 (FIG. 1). Location processor may also obtain the location of the subscriber unit through a combination of several geographic-location techniques known in the art. Location processor may use separate location receivers and antennas (not shown). Subscriber unit location data is preferably time-stamped with timer 48 and stored in memory 43. This is described in more detail below.

In general, each subscriber unit is adapted to contain location data and a time-stamp associated with the location data. The location data is valid for a predetermined period of time that depends on the maximum distance the subscriber unit can travel within a certain period of time. This re-registration distance may depend on a satellite's footprint diameter, or the diameter of individual cells. For example, in the preferred embodiment of the present invention, satellites 12 (FIG. 1) have footprint diameters of approximately 500 km. In this embodiment, the maximum distance a subscriber unit may travel is set to approximately one-half the footprint diameter (e.g., 250 km). The larger the footprint region or cell size, the longer the validity time of the location data. For example, micro-cell systems, such as Personal Communications Systems (PCS) that have very small cells, the location data validity time would be very short, while in geostationary satellite systems, the location data validity time would be very long.

Preferably, each subscriber unit has a category associated therewith, the category preferably is associated with the maximum distance the subscriber unit can travel within a certain period of time. In the preferred embodiment, subscriber units fall into one of five categories. For example, some subscriber units are stationary (category one—zero velocity). These category one subscriber units include ground stations, ground terminals or other subscriber units that are at least semi-permanently associated with a fixed geographic location. Other subscriber units are low-velocity subscriber units (category two). These category two subscriber unit include hand-held units, subscriber units mounted in automobiles, trucks, ships and on some trains.

Some subscriber units are medium-velocity subscriber units (category three) and include subscriber units located on high-speed trains or small aircraft, for example. Other subscriber units are high-velocity subscriber units (category four) and include those located on jet aircraft, for example. Subscriber units that don't fall into categories one through four fall into category five. Category five is a default category for subscriber units whose category is undefined or unknown, or whose velocity may exceed that of all other categories.

Preferably, each category of subscriber unit is defined by the maximum speed at which the subscriber unit may travel in a predetermined period of time, which relates to a maximum distance the subscriber unit can travel (i.e., the re-registration distance). In one embodiment, a subscriber unit has a settable option where the user can select the appropriated category. In another embodiment, the subscriber unit's category is preset by a service provider or preset at the factory.

Each of the five example subscriber unit categories is associated with a maximum velocity for the subscriber unit. Accordingly, location data is valid for an amount of time that's dependent on this velocity, and the re-registration distance. Preferably, a communication system has a maximum allowable distance defined as the re-registration distance. In the preferred embodiment, category one (semi-stationary subscriber units) is associated with a zero velocity, and therefore the location data is valid for a long amount of time, for example for several days, or months. Some subscriber units with permanent locations may have indefinitely valid location data. In the preferred embodiment, category two (low-velocity) subscriber units are associated with a velocity range of up to 250 kilometers per hour (kph), location data is valid for 45 minutes. In the preferred embodiment, category three (medium velocity) subscriber units are associated with a subscriber unit velocity range of up to 500 kph—location data is valid for up to 23 minutes. In the preferred embodiment, category four (high-velocity) subscriber units are associated with a subscriber unit associated with velocities of up to 1000 kph— location data is valid for up to 13 minutes. In the preferred embodiment, location data of category five subscriber units is presumed invalid, and as a result, category five subscriber units always require new location information whenever system access is requested.

Although only five categories of subscriber units are discussed herein, this invention may include any number of subscriber unit categories. Each category would be adapted to the requirements of the system in which the subscriber unit operates. For example, cell size, satellite velocity, channel reuse, geo-political boundaries and other requirements may affect the subscriber unit categories.

In general, whenever an amount of time has passed when a subscriber unit may have exceeded it's re-registration distance, new location data is required. A subscriber unit may do this automatically, when initially turned on, or when requested by an external input such as a user. In the preferred embodiment, whenever a subscriber unit travels more than 250 km from a previously registered location, the subscriber unit re-registers.

In the preferred embodiment of the present invention, a subscriber unit attempts to access the system by performing an acquisition process followed by an access process. The acquisition process establishes a communications link between a satellite and the subscriber unit. The process is initiated either by the subscriber unit's user taking some action to request a service that requires a traffic channel, for example. The subscriber unit may also recognize that it must re-register with the system. The subscriber unit may also respond to a ring-alert or page that notifies the subscriber unit of an incoming call. In all these situations, the subscriber unit acquires the system.

Figure 5:
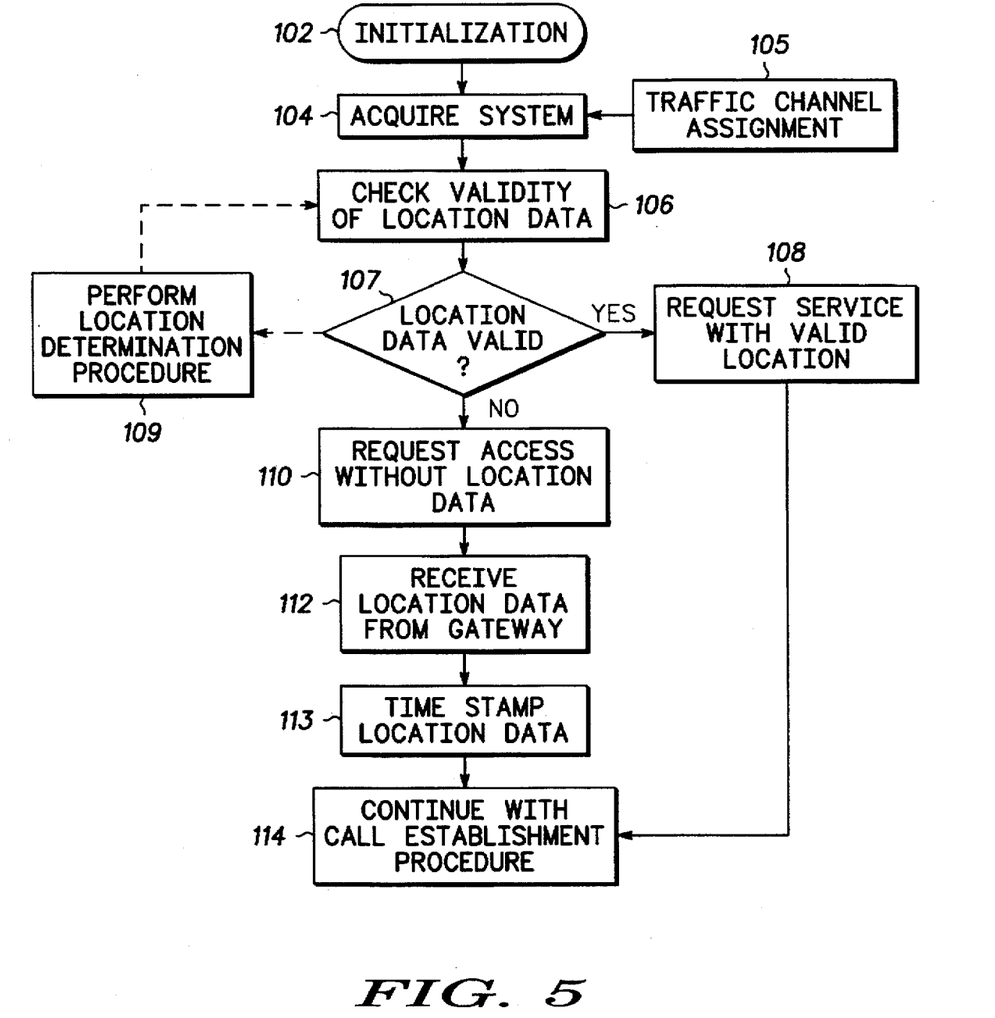
FIG. 5 shows a flow chart of a portion of an acquisition and access procedure 100 performed by a subscriber unit in accordance with a preferred embodiment of the present invention.

FIG. 5 shows a flow chart of a portion of an acquisition and access procedure 100 performed by a subscriber unit in accordance with a preferred embodiment of the present invention. Procedure 100 is preferably performed by a subscriber unit when activated or turned-on. In general, when a subscriber unit is initialized in task 102, the time-stamp associated with the location data is set as expired so that a new location of the subscriber is determined, as described below. In task 104, the subscriber unit acquires the system by receiving a satellite's broadcast channel 18 (FIG. 1). The subscriber unit estimates Doppler frequency offset and predicts timing uncertainty based on a beam identifier. The subscriber unit pre-corrects its timing frequency and transmits a ranging burst (acquisition burst) to the satellite on an acquisition channel 19 (FIG. 1), which is routed to the gateway. The gateway calculates the time and frequency error of the received acquisition burst, and sends a traffic channel assignment 105 to the subscriber unit, along with the time and frequency corrections. The subscriber unit, upon receiving the traffic channel assignment, transitions to the traffic channel 17 (FIG. 1) and acknowledges the channel change.

In task 106, the subscriber unit checks the validity of the location data stored in memory. This is preferably done by comparing the time-stamp associated with the location data with the present time. In the preferred embodiment, a subscriber unit's time stamp is valid for predetermined time period depending on the category of the subscriber unit. In the case of category one subscriber units, a time stamp is valid for a long period of time (e.g., years or months) while in the case of category four subscriber units, a time stamp is valid for only a few minutes, as discussed above. In one embodiment, the subscriber unit uses a count-up or count-down timer for this validity check.

Task 107 determines when the location data is valid. When the location data is valid, task 108 is executed, which requests service with known location data. Preferably, the time-stamp will be checked against the current time for an expiry condition. When the location data is invalid (i.e., expired), either task 109 or task 110 is executed wherein new location data is obtained.

If task 107 determines that the location data is valid, task 108 requests access (service) with known location data. Preferably, the subscriber unit generates an access request message containing an indication specifying that the subscriber unit's location data is valid. This access request may contain the location data, or simply may contain an indication that the location data is valid. In the later case, the subscriber unit's location data should have been stored at the gateway from the last registration process. Otherwise, the subscriber unit may send the location data to the gateway as part of the access request. In the preferred embodiment, location information is in the form of Cartesian coordinates with the center of the earth being the origin, however other representations of location, such as latitude and longitude, may also be used.

In one embodiment of the present invention, task 109 may also be performed when the location data is invalid. In task 109, the subscriber unit generates its own location data through location processor 45 (FIG. 4). In this embodiment, after the subscriber unit generates it's own location data, the location data is time-stamped and stored in memory of the subscriber unit. Task 106 and are then repeated, and desirably the location data will be found valid and a system access request may be made with known location data in task 108.

If task 107 determines that the location data is not valid, task 110 is performed. In task 110, the subscriber unit requests access (service) with unknown (or invalid) location data. The gateway performs a full location determination process. In the preferred embodiment, the subscriber unit transmits an access request message to the gateway indicating that the subscriber unit's location information is not being provided or is not available. However, an access request without any location data or without any indication that valid location data is available, may also direct the gateway to acquire location data on the subscriber unit. In task 110, the gateway is directed to determine the location of the subscriber unit. This procedure is described in more detail below.

In both tasks 108 and 110, the subscriber sends an access request to the communication system on the traffic channel that has been assigned in task 104. As mentioned above, the subscriber unit sends it's location data along with the access request. In another embodiment, the access request contains a bit that is set when location data is valid, and not set when the location data is invalid.

After the subscriber unit sends the access request to the gateway in task 110, the access request is received by the gateway, and the gateway generates location data for the subscriber unit (see procedure 200 (FIG. 6)).

Figure 6:
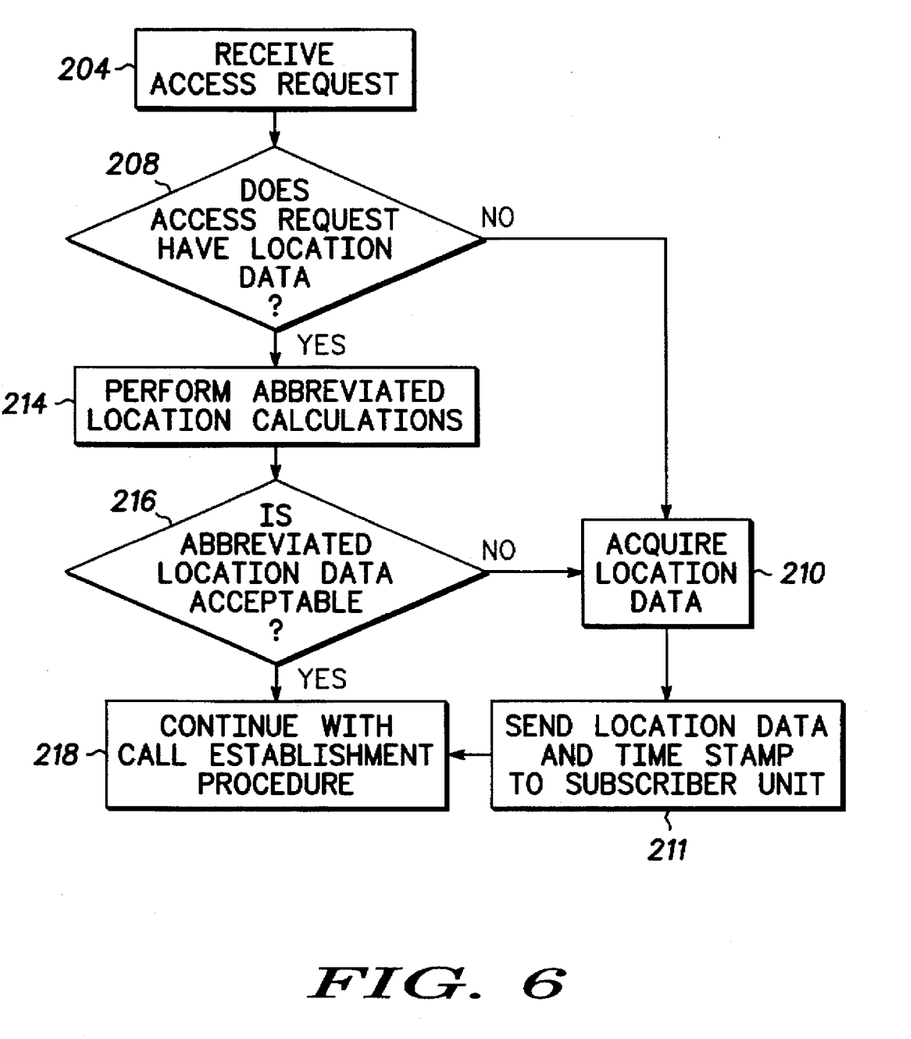
FIG. 6 shows a flow chart of an access procedure performed by a gateway in accordance with a preferred embodiment of the present invention.

The location of the subscriber unit may be determined by the gateway in a variety of ways. Preferably, the subscriber unit and a satellite exchange bursts on the traffic channel which are used to measure time and frequency offsets relative to the satellite time and frequency standard. The satellite derives the Differential Time of Arrival (DTOA) and Differential Frequency of Arrival (DFOA) measurements, and sends this information to the subscriber unit's home gateway. The home gateway uses this information to calculate range and range-rate curves. The location process projects the combination of range rate curves and range spheres on the surface of the earth. The intersection point of the range and range-rate curves is the location of the subscriber unit. The gateway sends the location data to the subscriber unit (see procedure 200 (FIG. 6).

In task 112, the subscriber unit receives the location data from the gateway. In one embodiment, the subscriber unit may also receive a time-stamp associated with the location data. In task 113, the subscriber unit, upon receipt of the location information from the gateway, stores this information, and time-stamps it with the time which it was received. In another embodiment of the present invention, rather than time-stamping location data, a timer or counter is started on the reception or generation of the location data. The count-up value or initial count down value is preferably determined by the category of the subscriber unit.

After task 108 requests access to the system with known location data, or after task 110 requests access to the system without location data, task 114 is performed. In task 114, the subscriber unit cooperates with the gateway in performing call establishment procedures. During this procedure, a subscriber unit and a called or calling party are placed in communication.

One major advantage to requesting access to the system with valid location data (task 108) is that the location determination process is not required to be performed when system access is requested. This saves the user significant time, especially when the user makes several calls back-to-back. Furthermore, system processing capacity and data transmission capacity is conserved because the system doesn't have to perform the location determination process. Furthermore, the location data may not have to be transferred to and from the subscriber unit.

FIG. 6 shows a flow chart of access procedure 200 performed by a gateway in accordance with a preferred embodiment of the present invention. In task 204, the gateway receives an access request from a subscriber unit. This access request is sent by the subscriber unit as part of either task 108 or 110 of procedure 100 (FIG. 5). The gateway continuously waits for access request messages from subscriber units. Whenever such a message arrives at a gateway, procedure 200 is executed for that access request while the gateway simultaneously continues to wait for other access request messages from other subscriber units.

Task 208 determines if the access request indicates that subscriber unit requesting access has location data. For example, this may be indicated by a bit that is set when the location data is valid and not set when the location data is invalid or the subscriber unit does not have location data. As discussed above, in one embodiment of the present invention, the access request contains the location data. Preferably, subscriber units have the option of sending access request messages either with or without location data (see procedure 100, FIG. 5). The message structure allows the gateway to determine whether such location data has been included in the message. In the preferred embodiment, this is accomplished by the use of type and value fields associated with optional information elements, of which known location data is one example. If the gateway detects the known location data type field, the following field contains the known location data. In the preferred embodiment, this known location data is in the form of XYZ grid code (Cartesian coordinates), along with measurement precision information.

When task 208 determines that the access request message contain location data, or that the subscriber unit indicates that it's location data is valid, task 214 is executed. In task 214, abbreviated location calculations are performed. When task 208 determines that the access request message does not contain location data, or that the subscriber unit indicates that it's location data is not valid, task 210 is executed. In task 210, a full location calculation is performed.

One purpose of performing an abbreviated location calculation is to check the "sanity" of the location data included in the access request message (e.g., fraud detection) with somewhat coarse precision. This requires much less time than for a full location calculation which would otherwise need to be performed.

In the preferred embodiment, the abbreviated geolocation calculation of task 214 is performed by a gateway. Preferably, the gateway receives the known location data provided by the subscriber unit, or retrieves the location data stored in the home gateway for the subscriber unit. The gateway receives the satellite identifier and associated beam identifier provided by the satellite for which the system access request originated. The gateway compares the subscriber unit's location data with the satellite identifier and beam identifier which are currently providing coverage for that area of the earth. The subscriber unit's location data should identify a location which is within the satellite and antenna beam currently providing coverage for that geographic location of the subscriber unit.

Task 216 determines if the subscriber unit's location data is valid. When the satellite and associated antenna beam correlates approximately with the subscriber unit's location data, task 216 determines that the subscriber unit's location data is valid. Accordingly, the time consuming full geolocation calculation process has been bypassed saving time and processing power. If the location data is valid, task 218 is performed.

On the other hand, if the location data is not valid, a full location calculation is performed by task 210. When the satellite and associated antenna beam does not correlate approximately with the subscriber unit's location data, task 216 determines that the subscriber unit's location data is not valid, and task 210 is executed. Task 210 performs full location calculations for the subscriber unit. This requires significant time and processing resources. The location of the subscriber unit must be determined before an access decision can be made for the access request. In the preferred embodiment, task 210 uses information provided by the subscriber unit, at least one satellite, and a gateway to determine the location of the subscriber unit.

The preferred location determining process is as follows. The subscriber unit requests a burst against which to make measurements of propagation time-delay and Doppler frequency offset. It enters a mode that enables the making of the measurements on the next downlink burst. The satellite responds with a downlink burst. When the downlink burst arrives, the subscriber unit develops estimates for the measured parameters, and transmits a burst to the satellite that includes the propagation time and Doppler frequency offsets that were used to establish the transmitter timing and frequency for that burst.

When the satellite receives the burst from the subscriber unit, it measures the time and frequency offsets of the burst relative to the satellite time and frequency standards. It then places these differential time of arrival (DTOA) and differential frequency of arrival (DFOA) measurements along with the propagation time and Doppler frequency estimates sent by the subscriber unit and the time the burst was received into a message that is sent to the Gateway. The gateway combines the subscriber unit estimates and satellite measurements into coarse propagation time and Doppler measurements using the following equations.

$$F(dcoarse)=F(d)+F(offsv)/2.$$

$$T(pcoarse)=T(p)+T(offsv)/2.$$

F(d) is the subscriber unit Doppler frequency estimate; F(offsv) is the measured DFOA offset at the satellite; T(p) is the subscriber unit propagation time estimate; and T(offsv) is the measured DTOA at the satellite.

The gateway geolocation process converts the propagation time and Doppler frequency into range and range-rate. The range can be estimated from propagation delay by TP=R/C. R is the range from the transmitting subscriber unit and the spacecraft, and C is the speed of light. For a given value of propagation delay, this equation represents a sphere of constant range around the spacecraft. The point where this sphere intersects with the surface of the Earth appears to be a circle for a constant propagation delay (range) value. Doppler frequency is translated into range-rate using the equation: Rdot=FD(C/FRF). FD is the Doppler frequency and FRF is the RF frequency of the channel used for the uplink. Curves of constant range-rate (Doppler frequency) are hyperboloids centered on the satellite. The location procedure projects the combination of range rate curves, and range spheres on the surface of the Earth. The intersection point of the range and range rate curves is the location of the subscriber unit. Since the constant range is a circle (on the surface of the Earth), the range-rate curve intersects the circle in two places. The two intersections are equally spaced from the line of Doppler symmetry. This line is near the satellite ground track, but its slightly offset by the Earth's rotation. In most cases, the serving antenna beam ID is used to identify which ambiguous location solution is correct. When the two locations are near the satellite ground track, the beam ID is insufficient, and the gateway will request another location measurement. This information is used by the gateway in resolving the ambiguity.

The ephemeris for the satellite that performed the geolocation measurements is used to translate the subscriber unit location from satellite relative to earth relative co-ordinates. It first estimates an initial position based on the range and range-rate. Then, it consults an Earth geodetic model and corrects the value for the altitude of the region of the subscriber unit.

The next step in the geolocation process is estimating the accuracy and confidence factor with the position estimate of the subscriber unit. The process begins with the a priori statistics of the random errors in the subscriber unit and satellite measurements and the satellite ephemeris error. These statistics are "weighted" by the relative importance of the errors in the satellite-subscriber unit geometry indicated by the current solution. The geolocation process creates an overall three dimensional probability density function (PDF) representing an aggregation of all process errors. This PDF is reduced to a two-dimensional location error ellipse by integrating it to achieve the required confidence factor associated with the estimated subscriber unit location.

If the position accuracy is adequate, the location determination portion of the access function is complete. If the subscriber unit position does not converge, or if the position accuracy is over the threshold, the gateway requests an additional measurement. This process may iterate for up to a total of four measurements. Desirably, measurements are at least 4.3 seconds apart to allow a satellite time to move for triangulation reasons. In the preferred embodiment, the exchange of information in task 210 is accomplished on the traffic channel that is assigned to the subscriber unit in task 104 of procedure 100 (FIG. 5). At the completion of task 210, the gateway has location data for the subscriber unit.

In task 211, the location data is provided to the subscriber unit. The subscriber unit may use this information in its next access request, possibly avoiding the need for the gateway to perform the full location calculation at that time. The subscriber unit receives this location data from the gateway in task 112 of procedure 100 (FIG. 5). In one embodiment, in task 211, the gateway time-stamps the location data and sends the time-stamp associated with the location data to the subscriber unit along with the location data. In this embodiment, task 113 of procedure 100 does not have to be performed by the subscriber unit.

After task 211 is completed, or after task 216 determined that the abbreviated location data indicated that the subscriber unit's location data was acceptable, task 218 is executed. In task 218, the call establishment procedure is continued. The location data may be used by the gateway to assign the call to the proper visiting gateway which is typically closest gateway to the subscriber unit. The location data may also be used for billing purposes and fault isolation.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. In a subscriber unit that communicates within a communication system that includes at least one communication node, a method of accessing said communication system comprising the steps of:

checking a validity of location data stored within said subscriber unit, said location data being valid for a validity period based on a mobility factor associated with said subscriber unit, said mobility factor including a maximum velocity said subscriber unit is capable of traveling;

when said location data is valid, sending an access request that includes said location data to said communication system; and cooperating with said one communication node to establish a communication link between said subscriber unit and said one communication node after said location data is verified by said communication system.

2. A method as claimed in claim 1 wherein said location data expires after said validity period, wherein:

when said subscriber unit is a stationary subscriber unit, said validity period being at least several days;

when said subscriber unit is located on an aircraft, said validity period being up to and including thirteen minutes; and when said subscriber unit is a mobile subscriber unit located on the ground, said validity period being up to and including forty-five minutes.

3. A method as claimed in claim 2 wherein said location data has a time-stamp associated therewith, and wherein the checking step further comprises the steps of:

comparing said time-stamp with a current time to arrive at a time difference;

when the time difference is greater than said validity period, determining that said location data is invalid; and when said time difference is less than said validity period, determining that said location data is valid.

4. A method as claimed in claim 3 wherein said one communication node provides a plurality of antenna beams, each antenna beam having a beam identifier associated therewith, and wherein the sending step further comprises said subscriber unit sending said access request to said one communication node within one of said antenna beams, and wherein said communication system includes a gateway in communication with said one communication node, said gateway for verifying said location data by comparing said beam identifier of said one antenna beam with said location data provided by said subscriber unit, and wherein the cooperating step establishes said communication link with said subscriber unit on a communication channel provided by said one antenna beam.

5. A method as claimed in claim 4 wherein said gateway has a location determining processor for determining locations of subscriber units, and wherein the method further comprises the steps of:

when said location data is determined to be invalid, said subscriber unit sending said access request without said location data to said communication system; and receiving valid location data from said gateway.

6. A method as claimed in claim 5 wherein further comprising the steps of:

time-stamping said valid location data received from said gateway with said time-stamp; and storing said valid location data and said time-stamp in memory of said subscriber unit.

7. A method as claimed in claim 6 wherein when said gateway receives said access request from said subscriber unit without said location data, said gateway performs a location determining procedure to determine said valid location data.

8. A method as claimed in claim 4 further comprising the steps of:

when said location data is determined to be invalid, said subscriber unit performing a location determining procedure to acquire valid location data; and sending an access request that includes said valid location data to said communication system.

9. A method as claimed in claim 8 further comprising the steps of:

time-stamping, by said subscriber unit, said valid location data acquired by said subscriber unit; and storing said valid location data and said time-stamp in memory of said subscriber unit.

10. In a gateway for use in a communication system that has at least one communication node in communication with said gateway, a method of operating said gateway comprising the steps of:

receiving an access request from a subscriber unit, said request including location data for subscriber unit, said subscriber unit having a mobility factor associated therewith, said mobility, factor based on a maximum velocity said subscriber unit is capable of traveling;

validating said location data, said location data being valid for a validity period based on said mobility factor;

when said location data is valid, allowing said subscriber unit access to said communication system; and when said location data is not valid, performing a location determining procedure to acquire valid location data for said subscriber unit.

11. A method as claimed in claim 10 wherein said location data expires after said validity period, wherein: when said subscriber unit is a stationary subscriber unit, said validity period being at least several days;

when said subscriber unit is located on an aircraft, said validity period being up to and including thirteen minutes; and when said subscriber unit is a mobile subscriber unit located on the ground, said validity period being up to and including forty-five minutes.

12. A method as claimed in claim 11 further comprising the steps of:

when said access request does not include location data, performing said location determining procedure to acquire said valid location data for said subscriber unit;

sending said valid location data to said subscriber unit; and cooperating with said one communication node to establish a communication link between said subscriber unit and said one communication node.

13. A method as claimed in claim 12 wherein said one communication node provides a plurality of antenna beams, each antenna beam having a beam identifier associated therewith, and wherein the receiving step further comprises receiving said access request from said one communication node, said access request including said beam identifier associated with one of said antenna beams where said subscriber unit is located, and wherein the validating said location data step further comprises the steps of comparing said beam identifier of said one antenna beam with said location data provided by said subscriber unit, and wherein the cooperating step establishes said communication link with said subscriber unit on a communication channel provided by said one antenna beam.

14. A subscriber unit for operating in a communication system having at least one communication node comprising:

a memory for storing location data;

a processor for checking validity of said location data, said location data being valid for a validity period based on a mobility factor associated with said subscriber unit, said mobility factor including a maximum velocity said subscriber unit is capable of traveling; and a transceiver for sending an access request to said communication system, said access request including said location data when said location data is valid, said transceiver for cooperating with said one communication node to establish a communication link between said subscriber unit and said one communication node.

15. A subscriber unit as claimed in claim 14 wherein said location data expires after said validity period, wherein: when said subscriber unit is a stationary subscriber unit, said validity period being at least several days;

when said subscriber unit is located on an aircraft, said validity period being up to and including thirteen minutes; and when said subscriber unit is a mobile subscriber unit located on the ground, said validity period being up to and including forty-five minutes.

16. A subscriber unit as claimed in claim 15 wherein said location data has a time-stamp associated therewith, and wherein the processor has means for comparing said time-stamp with a current time to arrive at a time difference, when the time difference is greater than said validity period, determining that said location data is invalid, and when said time difference is less than said validity period, determining that said location data is valid.

17. A subscriber unit as claimed in claim 16 wherein said one communication node provides a plurality of antenna beams, each antenna beam having a beam identifier associated therewith, and wherein the transceiver includes means for sending said access request to said one communication node within one of said antenna beams, and wherein said communication system includes a gateway in communication with said one communication node, said gateway having means for verifying said location data by comparing said beam identifier of said one antenna beam with said location data provided by said subscriber unit, and wherein the processor has means for establishing said communication link with said subscriber unit on a communication channel provided by said one antenna beam.

18. A subscriber unit as claimed in claim 17 wherein said gateway has a location determining processor for determining locations of subscriber units, and wherein the processor has means for:

sending said access request without said location data to said communication system when said location data is determined to be invalid, and said transceiver has means for receiving valid location data from said gateway.

19. A subscriber unit as claimed in claim 18 wherein said processor has means for time-stamping said valid location data received from said gateway, and said memory has means for storing said valid location data and said time-stamp.

20. A subscriber unit as claimed in claim 19 wherein said gateway has means for performing a location determining procedure to determine said valid location data when said gateway receives said access request from said subscriber unit without said location data.

21. A subscriber unit as claimed in claim 17 further comprising a location determining processor for performing a location determining procedure to acquire valid location data when said location data is determined to be invalid, and said transceiver has means for sending an access request that includes said valid location data to said communication system.

22. A subscriber unit as claimed in claim 21 further comprising a timer, and wherein said processor is further adapted for time-stamping said valid location data determined by said location determining processor using said timer, and wherein said memory has means for storing said valid location data and said time-stamp.

* * * * *